(12) United States Patent
Dupuis

(10) Patent No.: US 7,267,206 B2
(45) Date of Patent: Sep. 11, 2007

(54) DEVICE FOR THE HYDRAULIC ACTUATION OF A PARKING BRAKE AND METHOD FOR OPERATING SUCH A DEVICE

(75) Inventor: Vincent Dupuis, Saint Maur (FR)

(73) Assignee: Roger Bosch GmbH, Stuttgart (DE)

( * ) Notice: Subject to any disclaimer, the term of this patent is extended or adjusted under 35 U.S.C. 154(b) by 90 days.

(21) Appl. No.: 11/174,379

(22) Filed: Jul. 1, 2005

(65) Prior Publication Data

US 2006/0006735 A1   Jan. 12, 2006

(51) Int. Cl.
  *F16D 55/16* (2006.01)
(52) U.S. Cl. .................................. 188/72.8; 188/71.9
(58) Field of Classification Search ............... 188/71.9, 188/72.1–72.8, 2 D
  See application file for complete search history.

(56) References Cited

U.S. PATENT DOCUMENTS 3,372,623 A * 3/1968 Wearden et al. ............... 92/63
3,842,949 A * 10/1974 Newstead .................... 188/170
5,148,894 A * 9/1992 Eddy, Jr. .................... 188/72.6
6,186,284 B1 * 2/2001 Sauter et al. ................. 188/33
6,575,270 B2 * 6/2003 Farenden .................... 188/2 D

* cited by examiner

*Primary Examiner*—Xuan Lan Nguyen
(74) *Attorney, Agent, or Firm*—Leo H. McCormmick, Jr.; Sarah Taylor

(57) ABSTRACT

A parking and emergency brake device having an actuating device (10) that is supplied with pressurized fluid wherein a piston (14) slides in a cylinder (12, 22) to axially delimits a front hydraulic pressure chamber (16) and exert a determined mechanical force on an operating member over an actuating travel and a valve (18) to selectively place the front pressure chamber (16) in communication with a pressurized hydraulic fluid supply port (20). The valve (18) is interposed between the piston (14) and the cylinder (12) to controlled by an axial movement of the piston (14) over a control travel prior to actuating travel.

8 Claims, 6 Drawing Sheets

DEVICE FOR THE HYDRAULIC ACTUATION OF A PARKING BRAKE AND METHOD FOR OPERATING SUCH A DEVICE

The invention relates to a device for the hydraulic actuation of a parking brake and to a method for operating such a device.

BACKGROUND OF THE INVENTION

The invention relates more particularly to a parking or emergency brake device, particularly for a motor vehicle, of the type comprising a controlled actuating device which exerts a determined force on a brake operating member in order to apply the said brake blocking means so as to immobilize the vehicle and to a method for operating such an actuating device.

Numerous motor vehicle braking systems are known, the function of which is technically either to reduce or cancel the speed of the vehicle so fitted, or to keep it stationary, particularly when the vehicle is at a standstill for a prolonged period of time.

Thus, for a vehicle braking system, a distinction is made between a first function, known as the service brake function, and a second function known as the parking or emergency brake function.

The braking system therefore comprises at least one brake mechanism intended to fulfill the main service brake function and/or the parking brake function, the braking system for this purpose comprising a service brake device and a parking brake device.

Brake mechanisms of the state of the art essentially consist of two broad families, namely disk brakes on the one hand, and drum brakes on the other, the respective workings of which brakes are well known and will not be recalled in detail in the remainder of the description.

These brake mechanisms usually comprise unique blocking means which are able to be actuated selectively either by the main service brake device or by the parking brake device because these devices are not actuated simultaneously and fulfill very distinct braking functions, unless the parking brake is being used as an emergency brake.

Specifically, the parking brake device may constitute an emergency brake that can be operated by the driver in the event of failure of the motor vehicle main braking device.

In order in particular to allow the parking brake device to fulfill this emergency brake function, the braking system comprises separate control means for each of the two braking devices of the brake mechanism.

Document FR-A-2.829.543 describes one example of a disk-brake mechanism in which the brake cylinder comprises, in the conventional way, hydraulic actuating means intended, in response to a command from the brake pedal of the vehicle, to fulfill the service brake function, and mechanical actuating means intended to fulfill the parking brake function.

More specifically, the mechanical means of actuating the parking brake comprise a combination of moving parts which are controlled by a lever forming an operating member on which the end of the cable of a parking brake actuating device exerts a tensile force so as to cause the pads that form the brake blocking means to be applied to the brake disk.

Document FR-A-2.697.599 describes an example of a drum brake mechanism comprising, in the conventional way, main hydraulic actuating means intended, in response to a command via the brake pedal of the vehicle, to fulfill the service brake function and auxiliary mechanical actuating means fulfilling the parking or emergency brake function.

More specifically, the auxiliary mechanical means of actuating the parking brake comprise an actuating lever, mounted so that it can pivot, and which is able, under the action of a tensile force exerted via an operating cable on one of its ends, to cause primary and secondary shoes that form blocking means bearing friction linings to move apart against the internal cylindrical surface of the brake drum.

Also known are hybrid brake mechanisms which combine use of a disk brake and of a drum brake in order respectively to fulfill the main brake function and the parking or emergency brake function, each brake comprising blocking means actuated by a respective conventional actuating device.

More specifically, a brake mechanism such as this comprises a hydraulic device for actuating the service disk brake and a mechanical device for actuating the parking drum brake.

Documents U.S. Pat. No. 4,854,423 or WO-A-96.41085 describe such brake mechanisms, otherwise known as drum-in-hat mechanisms because such mechanisms have a central brake drum surrounded by the brake disk extending radially outwards so that in axial section it has the overall shape of a hat.

As will have been understood, whatever the type of brake mechanism, the applying of a parking braking force to apply the brake blocking means is obtained by actuating a parking brake device comprising an operating cable which exerts a determined force, generally a tensile force, on a lever that forms an operating member in order to change the status of the brake and allow the vehicle to be immobilized.

The parking brake device for this purpose comprises a controlled actuating device of mechanical type, such as a handbrake which nowadays is commonly fitted to motor vehicles.

Such a mechanical actuating device usually comprises a manual operating member consisting of a handbrake lever which is arranged in the cabin and is secured to one of the ends of an operating cable, the other end of which actuates the parking brake operating member.

Thus, to actuate the operating cable secured to the handbrake lever, the driver exerts on the said lever a control force the purpose of which is to cause a determined force, generally a tensile force, to be applied to a lever that forms the member for operating the parking brake.

In the case of mechanical actuation devices for actuating the parking brake, the energy needed to produce the braking force or input is therefore supplied solely by the physical strength of the driver.

This is one of the reasons why mechanical devices of the handbrake type are nowadays in particular considered to be unpleasant and tiresome to use, especially for those who have little physical strength.

In addition, the braking force applied which causes the parking brake blocking means to be applied depends directly on the force applied by the driver, which means that if the driver exerts in sufficient force on the handbrake lever, or even forgets to actuate it at all, the vehicle will then not be correctly immobilized and this may lead to accidents.

It will therefore be understood that a parking brake implementing a mechanical actuating device of the handbrake type is not as reliable or as dependable as might be wished.

Other parking brake actuating devices have been developed, particularly actuating devices that can be actuated electrically or fluidically, typically hydraulically.

Thus, document U.S. Pat. No. 4,792,447 describes, for example, an electric device for actuating a disk brake mechanism intended to fulfill the parking brake function.

However, such an electric actuating device is not satisfactory either, particularly because it requires a significant array of planetary gears and a high-powered electric motor which leads to a prohibitive cost of manufacture and in addition raises the problem of reliability should the on-board power source that powers the said device fail.

Document EP-A-0.526.273 describes a disk brake equipped with a parking brake actuated hydraulically by a pressure exerted by the driver on the vehicle brake pedal that applies pads, forming blocking means, to the faces of the brake disk.

The way in which the device for hydraulic actuation of the parking brake works is for a force to be exerted first of all on the brake pedal to generate a control pressure which causes the pads to be applied to the disk with a given braking force, then, with the foot still sustaining the force on the pedal, for an electric switch to be operated to switch on an electric motor which drives, in rectilinear translation along the axis of the piston, a sleeve coaxial with the said piston so as to lock the piston in a parking braking position in which the vehicle is immobilized.

However, such a hydraulic actuating device has numerous disadvantages.

Specifically, it is down to the driver, as before with a mechanical device of the handbrake type, to generate, through his or her own physical strength, the hydraulic pressure needed to apply the parking braking force.

In addition, as the electric motor is unable to increase the force with which the pads are applied to the disk, there is a risk that the vehicle might not be correctly immobilized if the driver does not depress the pedal or does not press it hard enough.

SUMMARY OF THE INVENTION

In order to remedy these disadvantages, the invention proposes a parking brake device comprising an actuating device using a pressurized hydraulic fluid to generate the determined force necessary to apply a satisfactory parking braking force.

To this end, the invention comprises a parking or emergency brake device, particularly for a motor vehicle, of the type comprising a controlled actuating device which exerts a determined force on a brake operating member in order to apply the said brake blocking means so as to immobilize the vehicle, of the type in which the actuating device, of hydraulic type, supplied with pressurized fluid, comprises:
  a cylinder in which there slides a piston which axially delimits a front hydraulic pressure chamber and which is able to exert the determined mechanical force on the operating member over an actuating travel, and
  valve means which selectively cause the front pressure chamber to be placed in communication with a pressurized hydraulic fluid supply port so as to establish—a hydraulic actuating pressure in the front pressure chamber, characterized in that the valve means, interposed between the piston and the cylinder, are controlled by an axial movement of the piston over a control travel prior to its actuating travel.

Advantageously, the actuating device according to the invention makes it possible to eliminate the handbrake lever from the cabin and in so doing save space thus allowing greater freedom in the layout of the cabin and improving passive safety.

In addition, the actuating device according to the invention requires little or no physical strength on the part of the driver and can be controlled in such a way that an effective parking brake force is thus applied independently of the physical capabilities of the driver.

As a preference, the actuating device according to the invention is connected, in order to supply it with pressurized-hydraulic fluid, to the vehicle brake circuit which also supplies pressurized fluid to the hydraulic actuating device that actuates the main service brake.

Advantageously, the actuating device according to the invention is connected, in order to supply it with pressurized hydraulic fluid, to the ESP pump with which the vehicle is equipped.

Advantageously, the actuating devices according to the state of the art, particularly the devices of the handbrake type, can be replaced by a hydraulic actuating device according to the invention, that occupies little space, and this is true regardless of the type of brake mechanism and without there being any need to modify the brake mechanism operating member.

Advantageously, the actuating device according to the invention is of simple construction, reliable and dependable, of a modest cost price and preferably is associated with a control member in the cabin that takes up a very small amount of space and is easy to actuate without a significant effort on the part of the driver.

According to other features of the device according to the invention:
  the valve means comprise primary and secondary sealing means which are able to be arranged axially respectively in front of and behind the pressurized fluid supply port so as to isolate the front hydraulic pressure chamber from the supply port when the piston is in the forward position of rest;
  the device comprises control means for the translational control of the piston over the prior control travel which corresponds to an axial movement of the piston in the cylinder between:
    a forward position of rest, towards which the piston is elastically returned and in which the valve means isolate the front hydraulic pressure chamber in a sealed manner from the supply port, and
    an intermediate position in which the front pressure chamber is supplied with pressurized hydraulic fluid;
  the control means controlling the axial movement of the piston comprise drive means, such as an electric motor, which are able to actuate movement-transmission means allowing a rotational movement of the motor to be converted into a translational movement of the piston;
  the movement-transmission means comprise a mechanism of the "screw-nut" type comprising a tapped nut which is axially immobilized and which is driven in rotation by the motor in such a way as to cause a translational axial movement of a threaded screw in the nut, the said screw being able to drive the movement of the piston;
  the piston can be moved backwards over an axial actuating travel from its intermediate position to a rear braking position, in which the piston acts on actuating means exerting the determined mechanical force on the brake operating member;

the device comprises mechanical-locking means intended to axially immobilize the piston in the rear braking position;

the actuating means for actuating the brake operating member are linked in terms of movement to the piston with a determined axial clearance which is roughly equal to the control travel of the piston so that the actuating means are not influenced when the piston moves from its forward position of rest to its intermediate position;

the actuating means are a rod comprising a cylindrical head which is mounted to move axially in a complementary internal cylindrical section of the piston between:

a forward position of rest, in which the head of the rod bears against a rear stop of the internal cylindrical section of the piston in the forward position of rest, and a rear operating position in which the head of the rod, which bears against a front stop of the internal cylindrical section of the piston is acted upon during the actuating travel so as to exert a determined mechanical force on the operating member.

The invention also proposes an operating method for controlling a parking or emergency brake device of the type comprising an actuating device according to the preceding characteristics, characterized in that it comprises, for operating the parking brake:

a first step which consists in actuating the control means that control the piston so as to move the piston from its forward position of rest towards its intermediate position in such a way as to allow pressurized hydraulic fluid to be supplied to the front pressure chamber;

a second step which consists in supplying the front pressure chamber with hydraulic fluid at a first pressure P1 so as to cause the piston to move against the action of the return means as far as its rear braking position in which it exerts on the actuating means that actuate the operating member, a maximum determined mechanical force corresponding to the applying, by the brake blocking means, of a sufficient braking force to immobilize the vehicle when it is parked; and a third step which consists in actuating the locking means to mechanically lock the piston in its rear braking position.

In addition, the operating method comprises, in order to release the parking brake, a step that consists in supplying the front pressure chamber with hydraulic fluid at a second pressure P2 higher than the first pressure P1 so as to allow the unlocking of the piston which is returned elastically towards its forward position of rest.

Other features and advantages of the invention will become apparent from reading the detailed description which follows, for an understanding of which reference will be made to the attached drawings.

DETAILED DESCRIPTION OF THE INVENTION

Figure 1:
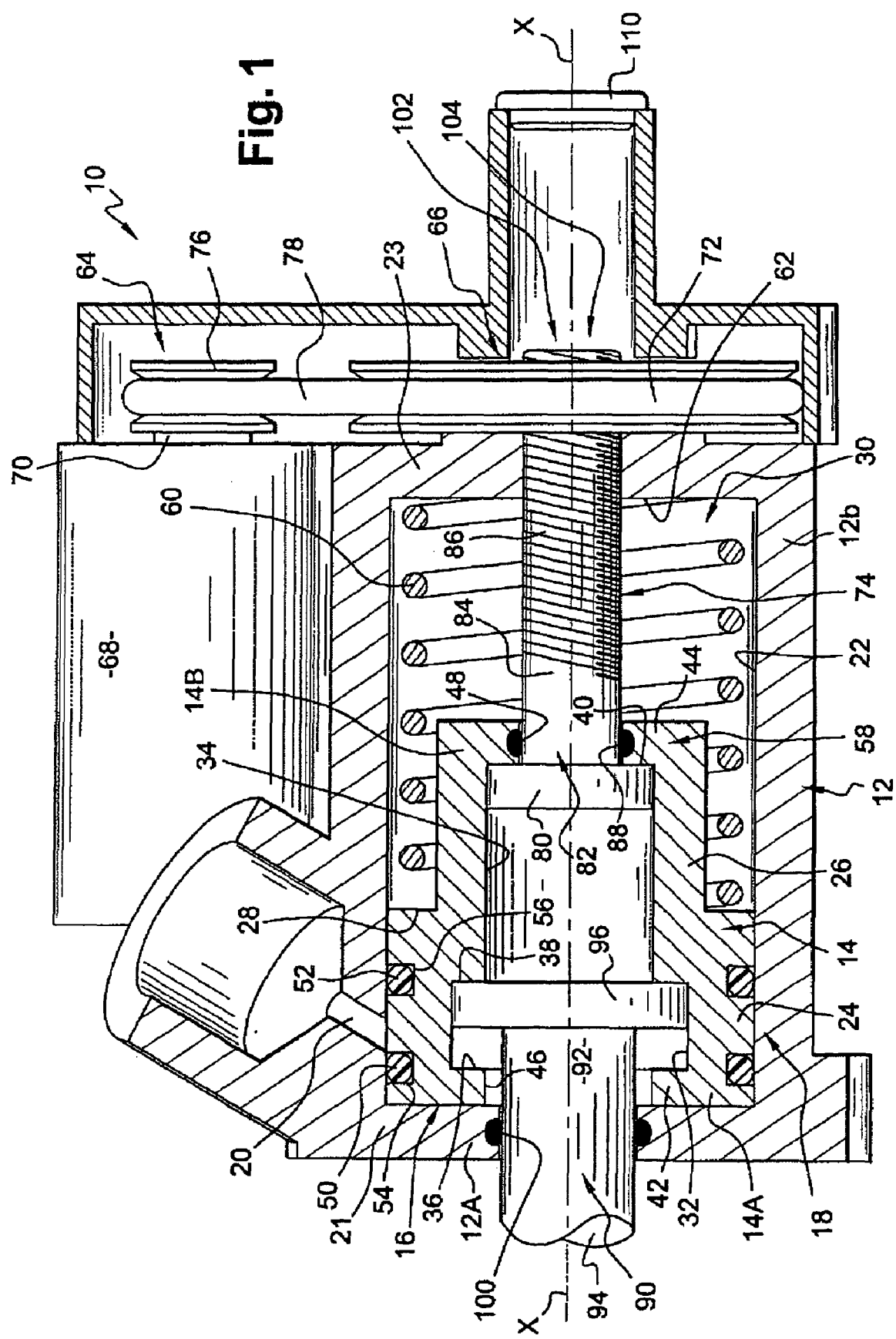
FIG. 1 is a view in axial section of a parking brake actuating device according to the invention.

In the description which will follow, identical reference numerals denote parts which are identical or have similar functions.

By convention, the terms "forward", "rear", "interior", "exterior", respectively denote elements or positions facing respectively to the left, to the right, to the top or to the bottom in FIG. 1.

FIG. 1 depicts a controlled actuating device 10 which is able to exert a determined mechanical force on a parking or emergency brake (not depicted) operating member so as to apply the said brake blocking means in order to immobilize the vehicle equipped with the brake device.

The controlled actuating device 10 is a device of hydraulic type, that is to say one in which the determined mechanical force it exerts on the operating member via the actuating device is obtained hydraulically.

The actuating device 10, an axis X of which determines an overall axial direction, comprises a cylinder 12 in which there slides a piston 14 which axially delimits a front hydraulic pressure chamber 16 and valve means 18 which selectively cause the front pressure chamber 16 to be placed in communication with a pressurized hydraulic fluid supply port 20 so as to establish a hydraulic actuating pressure in the said pressure chamber 16.

The cylinder 12 comprises a body which in this instance is made in two parts, a front part 12A and a rear part 12B respectively, to allow the moving parts of the actuating device 10, such as the piston 14, to be fitted and which are assembled by any appropriate means such as welding, bonding, elastic push-fitting or screwing, and preferably in a sealed fashion.

The cylinder 12 comprises an internal bore 22 with the cylindrical surface of which the piston 14 collaborates and which is delimited axially at the front by a front transverse wall 21 and at the rear by a rear transverse wall 23.

The piston 14 comprises at least one front external cylindrical section 24 for guiding the piston 14 in the bore 22 of the cylinder 12. The front external cylindrical section 24 is here extended axially towards the rear by a rear external cylindrical section 26 the outside diameter of which is smaller than the outside diameter of the front external cylindrical section 24.

The rear external cylindrical section 26 meets the front external cylindrical section 24 via a connecting face 28 which extends radially overall with respect to the axis X.

The piston 14 axially towards the rear delimits a rear chamber 30 radially delimited by the internal bore 22 of the cylinder 12.

The piston 14 comprises a front internal cylindrical section 32 and a rear internal cylindrical section 34.

The piston 14 is thus produced in two parts, a front part 14A and a rear part 14B respectively, so as to allow the fitting of moving parts that move by sliding, in the front 32 and rear 34 internal cylindrical sections.

The front internal cylindrical section 32 is axially delimited by a front stop face 36 and a rear stop face 38, which extend respectively radially with respect to the axis X.

The rear internal cylindrical section 34 is delimited axially towards the rear by a front stop face 40.

The piston 14 is therefore delimited radially by the front 24 and rear 26 external cylindrical sections and axially at the front by a front transverse wall 42 and at the rear by a rear transverse wall 44.

The front 42 and rear 44 transverse walls extend radially inwards and centrally comprise, respectively, a front drilling 46 and a rear drilling 48 which are intended to allow moving parts that slide axially in the front 32 and rear 34 internal cylindrical sections to pass through the walls.

According to the invention, the actuating device 10 comprises valve means 18 which are interposed between the piston 14 and the cylinder 12 and which are controlled by an axial movement of the piston 14 over a controlled travel prior to an actuating travel.

More specifically, the valve means 18 comprise primary 50 and secondary 52 sealing means able to be arranged axially respectively in front of and behind the pressurized fluid supply port 20 so as to isolate the front hydraulic pressure chamber 16 from the supply port 20 when the piston 14 is in the forward position, known as the position of rest, as illustrated in FIG. 1.

The primary 50 and secondary 52 sealing means are interposed radially between the piston 14 and the bore 22 of the cylinder 12 and in this instance are borne by the piston 14. The front external cylindrical section 24 comprises a front annular groove 54 and a rear annular groove 56 for mounting the primary 50 and secondary 52 sealing means respectively.

The primary 50 and secondary 52 sealing means consist, for example, of seals, such as O-rings made of elastomeric material, or composite seals.

As an alternative, the primary 50 and secondary 52 sealing means may be borne by the cylinder 12, the internal bore 22 similarly comprising front 54 and rear 56 annular grooves.

The actuating device 10 comprises control means 58 for controlling the movement of the piston 14 over a prior control travel corresponding to an axial translational movement of the piston 14 in the bore 22 of the cylinder 12 between a forward rest position, towards which the piston 14 is elastically returned and in which the valve means 18 isolate the front hydraulic pressure chamber 16 in a sealed manner from the supply port 20, and an intermediate position in which the front pressure chamber 16 is supplied with pressurized hydraulic fluid.

The piston 14 is elastically returned by an elastic return member 60, such as a compression spring, housed in the rear chamber 30 of the cylinder 12 and which bears respectively, at the front, on the connecting face 28 of the front 24 and rear 26 external cylindrical sections and, at the rear, on the front face 62 of the rear transverse wall 23 of the cylinder 12.

The rear external cylindrical section 26 of the piston is advantageously housed inside the first turns of the front end of the return spring 60 so as to guide the latter in axial translation.

The control means 58 for controlling the axial movement of the piston 14 comprise drive means 64 which are able to actuate movement-transmission means 66 making it possible, in particular, to convert a rotational movement into a translational movement of the piston 14.

The drive means 64 are formed by an electric motor 68 of which the output shaft 70 actuates the movement-transmission means 66.

The movement-transmission means 66 comprise a mechanism of the "screw-nut" type consisting of a tapped nut 72 which is axially immobilized and which is driven in rotation by the motor 68 in such a way as to cause an axial translational movement of a threaded screw 74 which is received in the nut 72 so as to drive the movement of the piston 14.

The motor 68 advantageously comprises a reduction device consisting of a first pulley 76 secured to the output shaft 70 of the motor and which, by means of a belt 78, drives the rotation of a second pulley formed by the nut 72.

As an alternative, the belt 78 may be replaced by any other appropriate means such as gearing.

The screw 74 comprises, axially from front to rear, a head 80 which is secured to a longitudinal body 82 comprising a first, front, cylindrical section 84 and a threaded second, rear, cylindrical section 86 intended to collaborate with the nut 72 of the movement-transmission means 66.

The head 80 slides axially in the rear internal cylindrical section 34 of the piston 14 and is able to come to bear against the front stop face 40.

The front cylindrical section 84 of the longitudinal body 82 of the screw 74 which section has no screw thread, passes through the rear transverse wall 44 of the piston 14 via the rear drilling 48 and collaborates with a rear seal 88 interposed radially between the section 84 and the drilling 48 so as, together with the secondary seal 52, to ensure the sealing between the front pressure chamber 16 and the rear chamber 30.

The actuating device 10 comprises actuating means 90 which directly or indirectly exert on the brake operating member a determined force in response to an influence on the piston 14 to which they are linked in terms of movement.

The actuating means 90 consist of an actuating rod 92 which is linked in terms of movement to the piston 14 with a determined axial clearance which is roughly equal to the control travel of the piston so that the actuating means 90 are not influenced when the piston 14 moves from its forward position of rest to its intermediate position.

The actuating rod 92, comprises, axially, from front to rear, a longitudinal body 94 to which there is secured a cylindrical head 96 which is mounted such that it can move axially in the front internal cylindrical section 32 of the piston 14.

The longitudinal body 94 passes axially through the front transverse wall 42 of the pistons 14 via the front drilling 46 and the front transverse wall 21 of the cylinder 12 via the front drilling 98.

A front seal 100 is interposed radially between the longitudinal body 94 and the front drilling 98 to seal the front pressure chamber 16.

The piston 14 is able to be moved backwards over a axial actuating travel from its intermediate position to a rear position, termed the braking position, in which the piston 14 acts on the cylindrical head 96 of the actuating means 90.

More specifically, in this instance the piston 14 exerts a tensile force on the cylindrical head 96 of the actuating means 90.

The actuating device 10 preferably comprises mechanical-locking means which are able to axially immobilize the piston 14 in the rear braking position.

The mechanical-locking means 102 advantageously consist of the actuating means 90 that control the movement of the piston 14 and that were described earlier.

Figure 2:
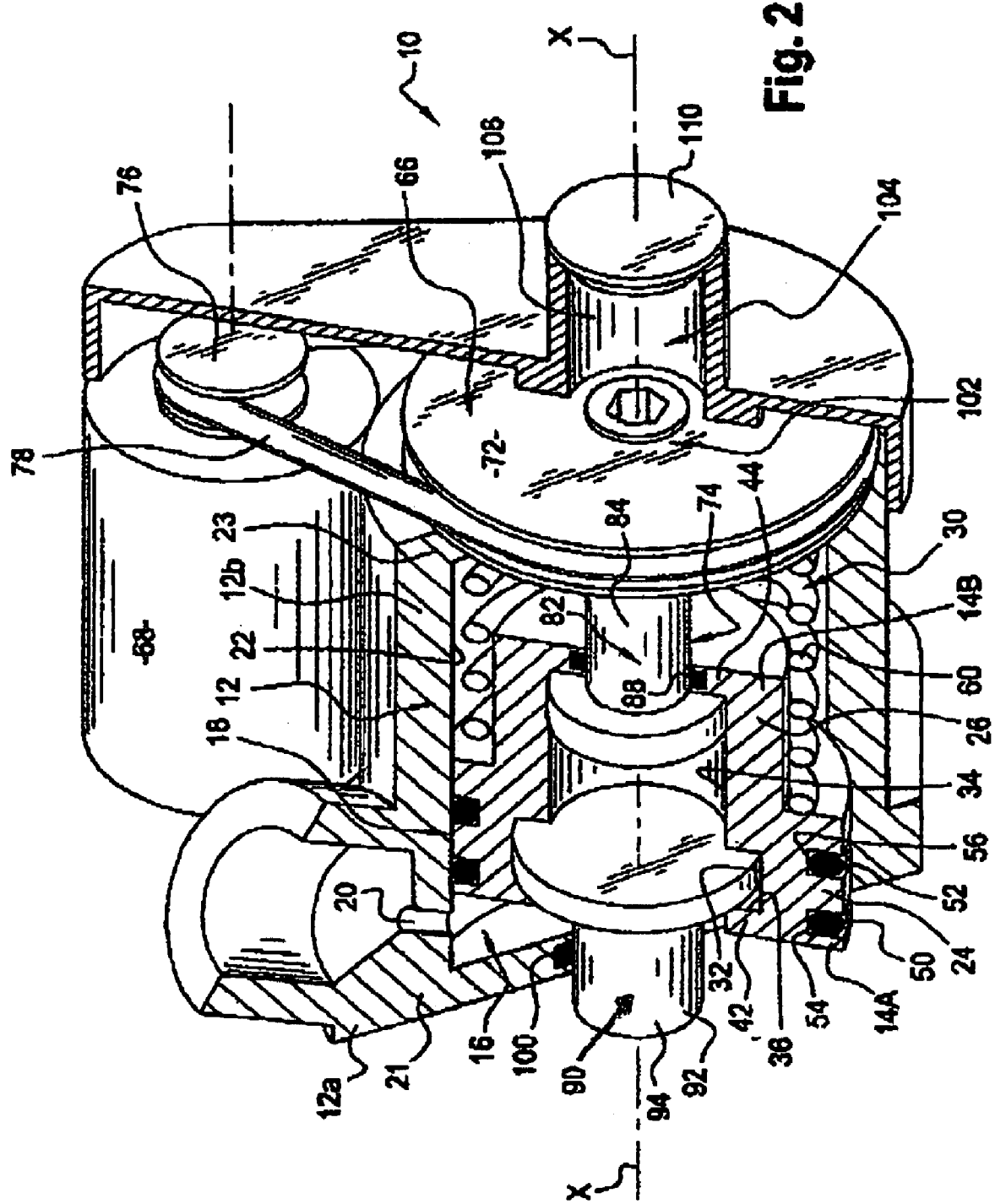
FIG. 2 is a three-quarters rear perspective view with cutaway illustrating a device according to FIG. 1.

As can be seen in FIG. 2, the locking means 102 comprise an emergency device 104 so as to allow the means 102 to be unlocked manually in the event of a malfunctioning of the electric motor 68 of the control actuating means 90.

The emergency device 104 comprises an access shaft 106 through which an operator can axially engage a tool, such as a screwdriver or a key, comprising, at its front end, a head of a shape that complements that of a socket 108 arranged at the rear end of the screw 74 of the transmission means 66.

Advantageously, the access shaft 106 for access to the emergency device 104 is closed off by a protective stopper 110 so as to prevent any external contamination of the actuating device 10, particularly by dust from the main service brake linings.

The way in which the actuating device 10 according to the invention works will now be explained with reference to FIGS. 3 to 6 which illustrate various steps in the operation of the parking brake.

Figure 3:
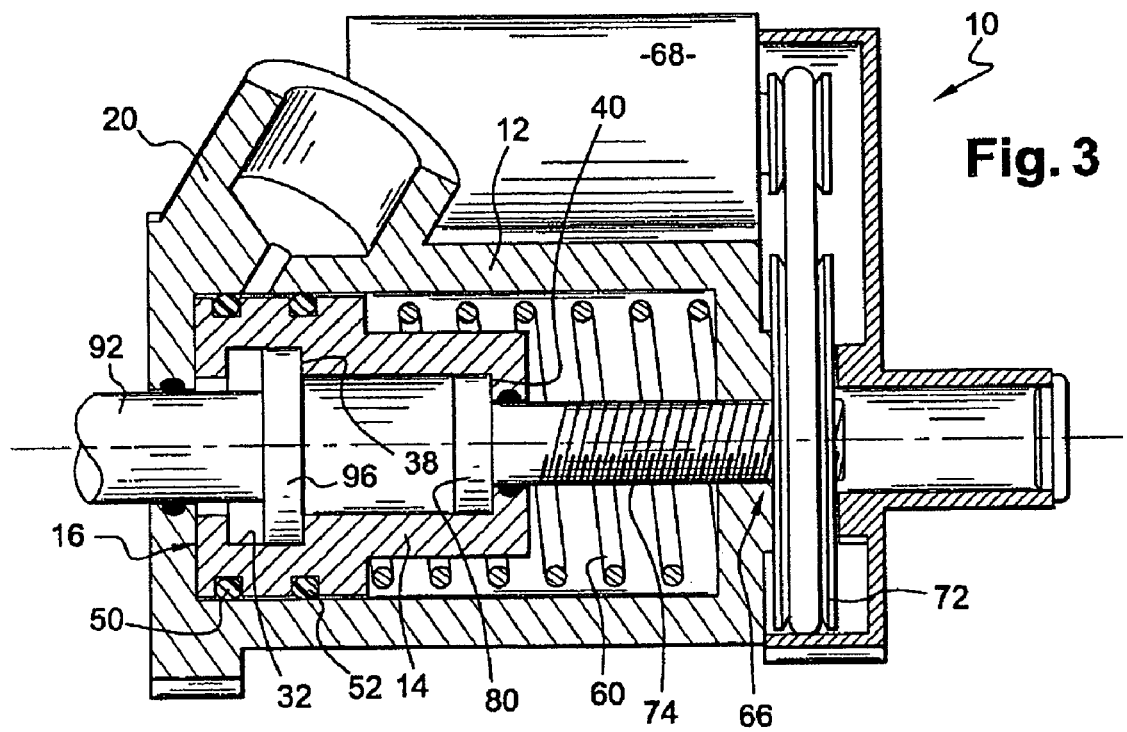
FIGS. 3 to 6 are views in axial section of a device according to FIG. 1 which illustrate various operating positions when activating the parking brake.

FIG. 3 depicts the actuating device 10 in the rest configuration.

In this configuration, the piston 14 is urged elastically by the spring 60 and is in its forward position of rest in which the primary 50 and secondary 52 seals extend axially on each side of the supply port 20 thus isolating the front pressure chamber 16, the volume of which is practically zero.

The actuating rod 92 occupies a forward position of rest in which the cylindrical head 96 bears against the rear stop face 38 of the front internal cylindrical section 32.

The head 80 of the screw 74 bears against the rear stop face 40 of the rear internal cylindrical section 34.

According to a first step in the operating method for controlling the actuating device 10 according to the invention, the control means 58 for controlling the piston 14 are actuated so as to move the piston 14 from its forward position of rest to its intermediate position so as to allow the front pressure chamber 16 to be supplied with pressurized hydraulic fluid.

More specifically, the electric motor 68, in response to a command to activate the parking brake device, turns the nut 72 of the transmission means 66 and thus causes the screw 74 to move axially backwards.

Figure 4:
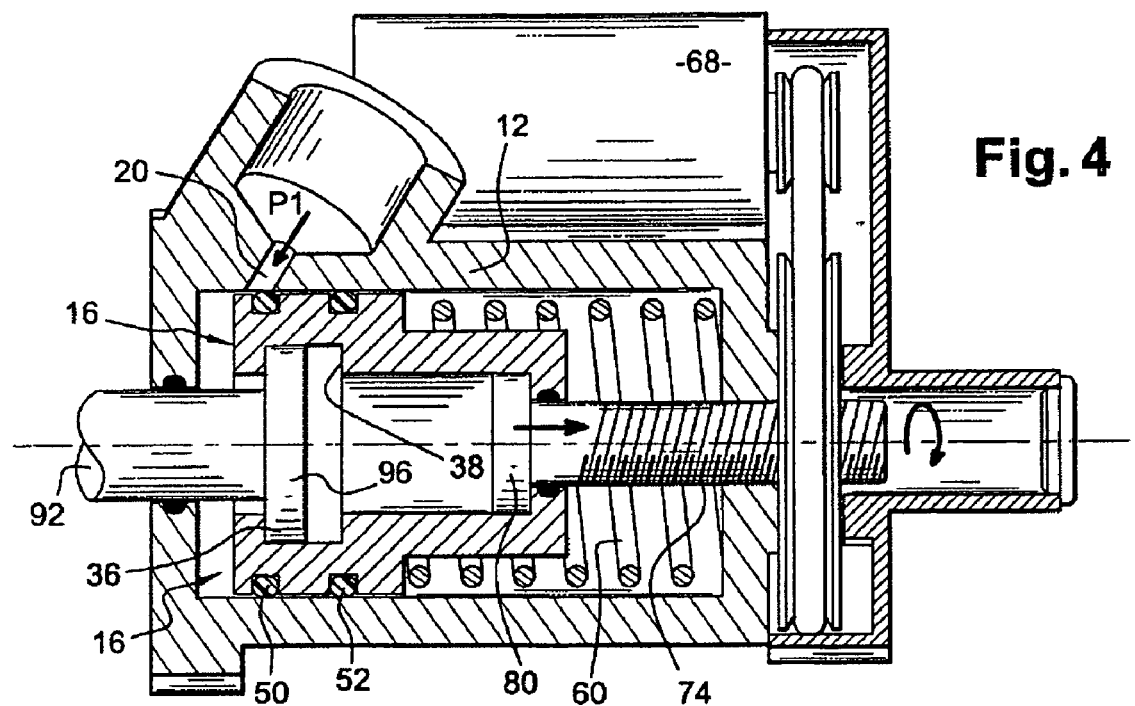

As the head 80 is bearing against the rear stop face 40 of the piston 14, the said piston 14 is driven in a translational movement backwards over a control travel until it reaches an intermediate position, as illustrated in FIG. 4.

During this control travel, the actuating rod 92 is not influenced by the piston 14 and slides axially in the front internal cylindrical section 32 of the piston 14 until it comes to bear against the front stop face 36.

The backwards axial movement of the piston 14 has the effect of moving the primary seal 50 behind the supply port 20 to the front pressure chamber 16 which can consequently, according to a second step of the control method, be supplied with hydraulic fluid at a first pressure "P1".

Figure 5:
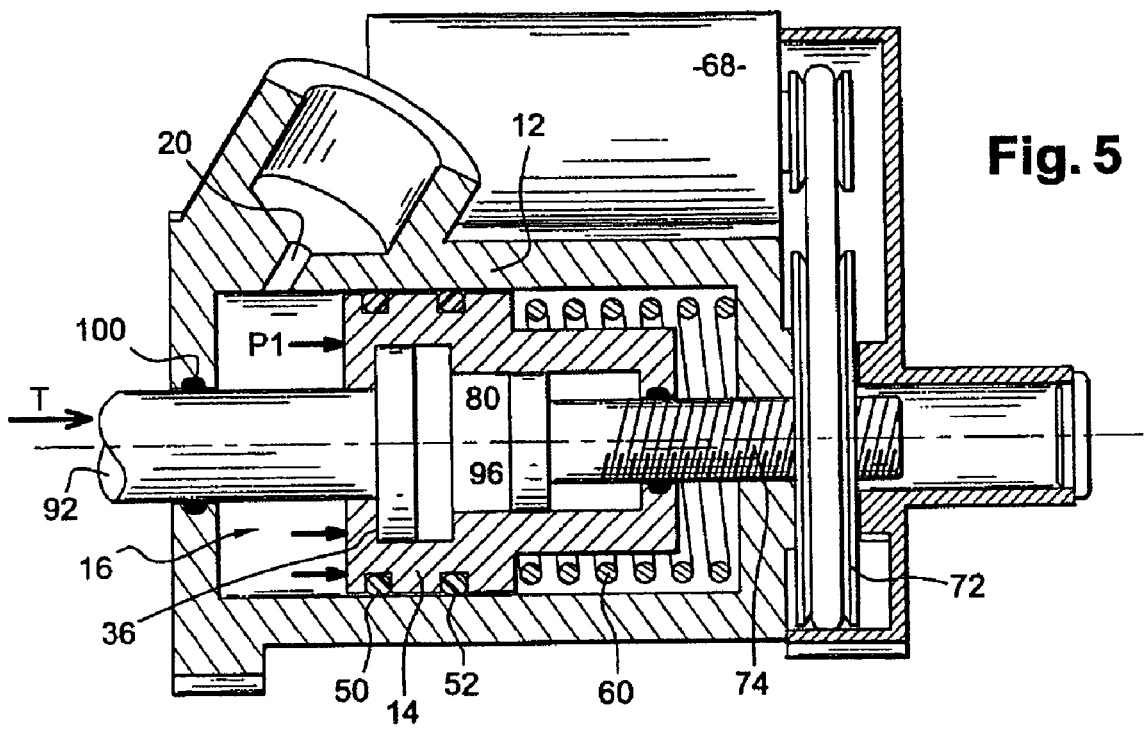

As can be seen in FIG. 5, the establishing of the pressure "P1" in the front pressure chamber 16 causes the piston 14 to move backwards against the return force exerted by the elastic return spring 60.

The piston 14 then covers an actuating travel corresponding to an axial movement from its intermediate position to its rear braking position.

During this actuating travel, the piston 14 acts on the cylindrical head 96 of the actuating means 90 with a tensile force "T" which is transmitted by the actuating rod 92 to the parking brake device operating member.

Figure 6:
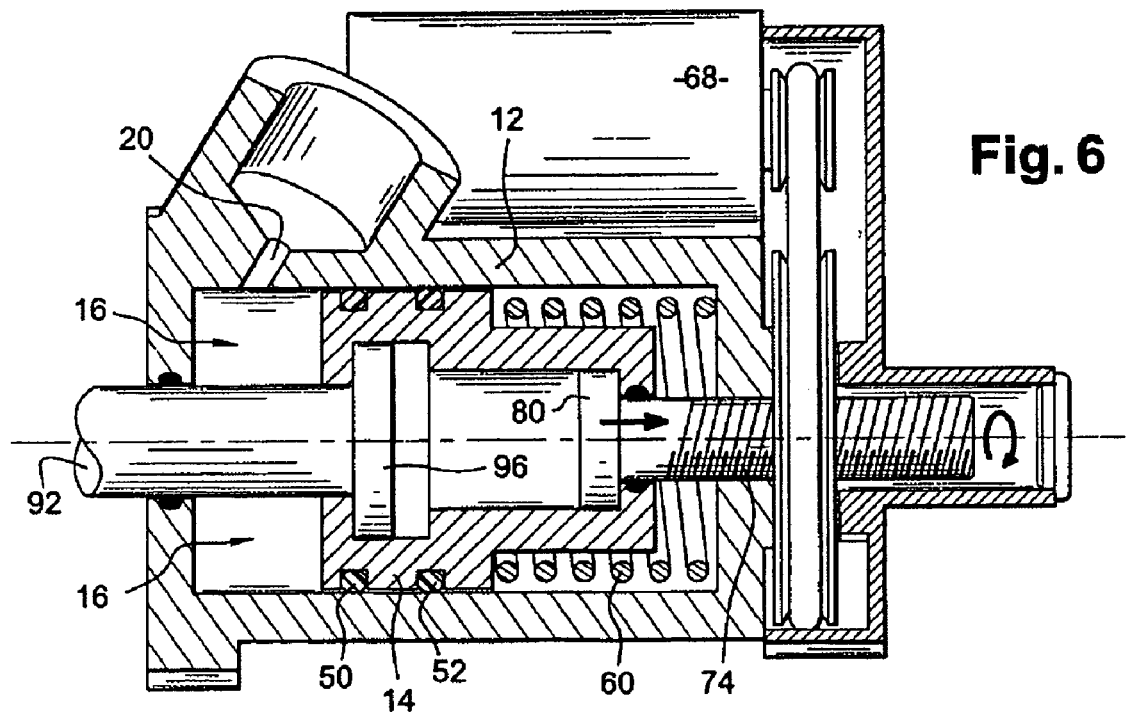

When the piston 14 occupies its rear braking position, as illustrated in FIG. 6, the actuating rod 92 then exerts a determined mechanical force on the operating member which corresponds to the applying, by the parking brake blocking means, of a sufficient braking force to immobilize the vehicle.

According to a third step of the operating method, the electric motor 68 is actuated once again to cause the screw 74 to move backwards until the screw head 80 is bearing against the rear stop face 40 of the section 34 of the piston 14.

The piston 14 is then locked in the rear braking position so that there is no longer any need to maintain the pressure P1 in the front pressure chamber 16.

As an alternative, the electric motor 68 controlling the movement of the screw 74 could be actuated in such a way that, at the same time as fluid at the pressure "P1" is supplied to the front pressure chamber 16, the screw 74 accompanies the piston 14 as it moves over the actuating travel.

The release of the parking brake device will now be described with reference to FIGS. 7 to 10.

Figure 7:
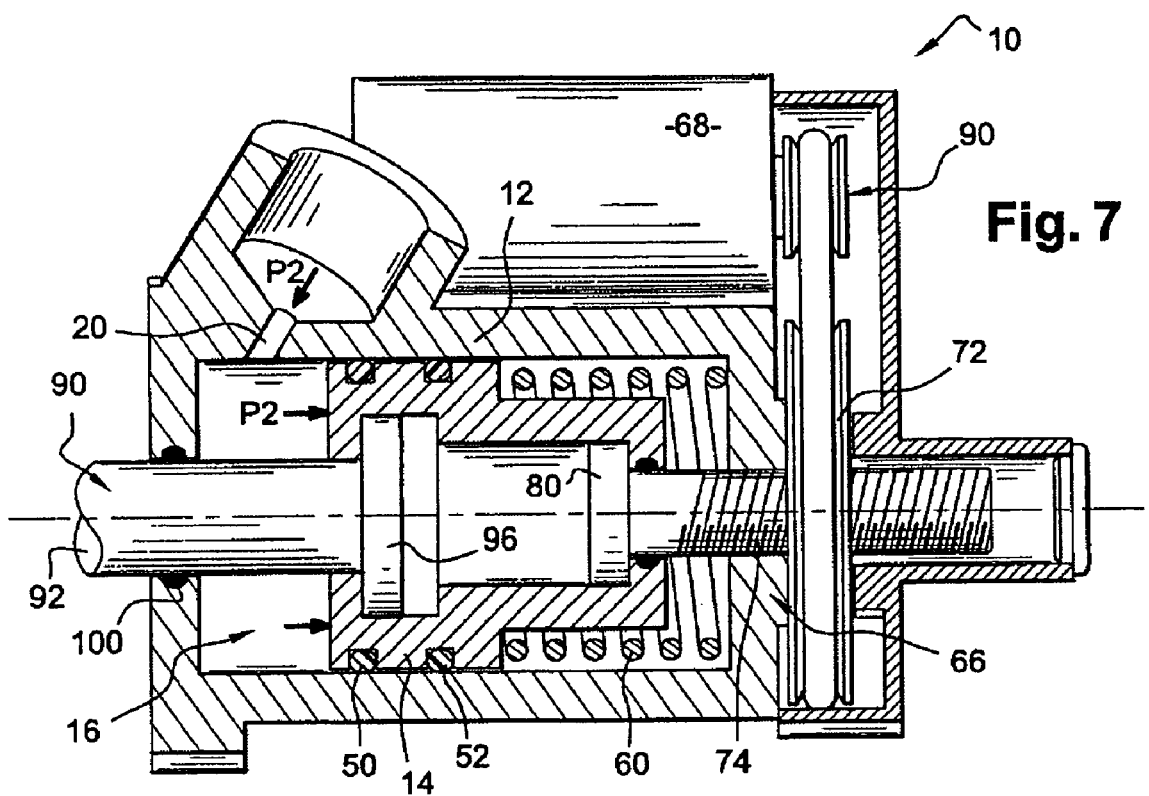
FIGS. 7 to 10 are views in axial section of a device according to FIG. 1 illustrating various operating positions when deactivating the parking brake.
Figure 8:
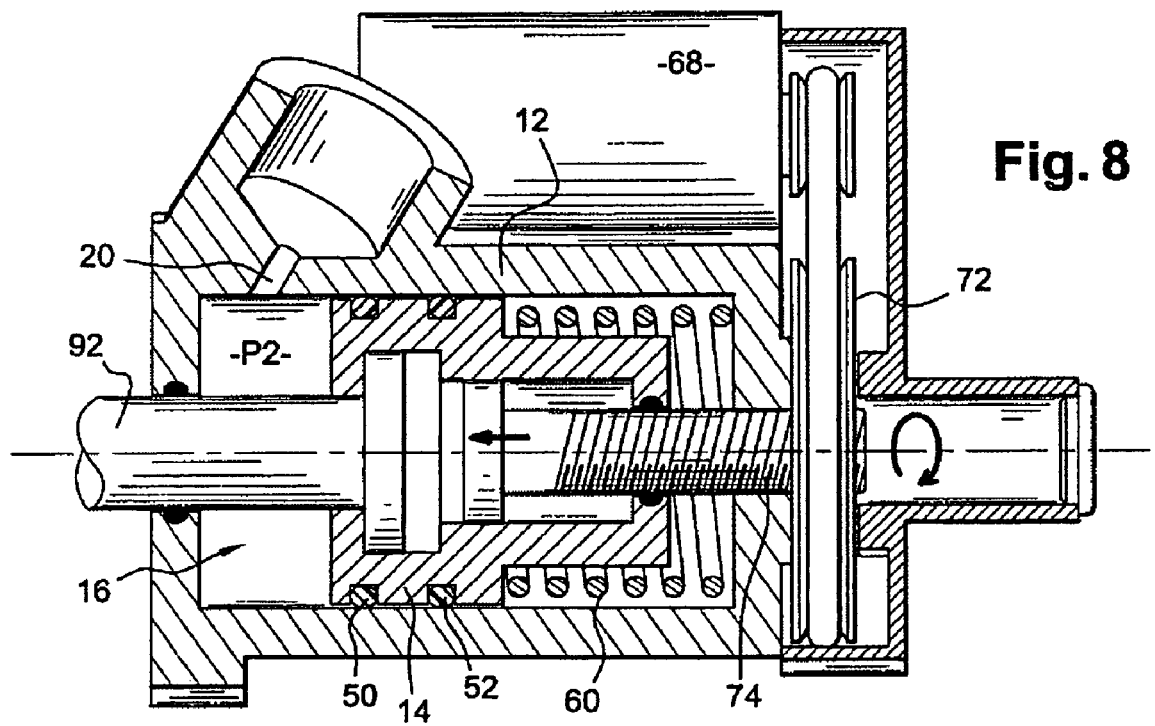

According to the operating method according to the invention, the release of the parking brake is obtained by supplying the front pressure chamber 16 with fluid at a pressure "P2" higher than the pressure P1 so as to exert on the return spring 60 that returns the piston 14 a higher force and allow the electric motor 68 to drive the screw 74 from its rear locking position illustrated in FIG. 7 as far as a forward position illustrated in FIG. 8.

The motor 68 can therefore advantageously be a motor of small size, which has enough power to turn the nut 72 or to turn the screw 74 directly.

As soon as the piston 14 has been unlocked, the pressure "P2" ceases to be applied to the front pressure chamber 16.

Advantageously, the pressures "P1" and "P2" of hydraulic fluid are obtained by means with which the vehicle is equipped, such as the ESP pump.

Figure 9:
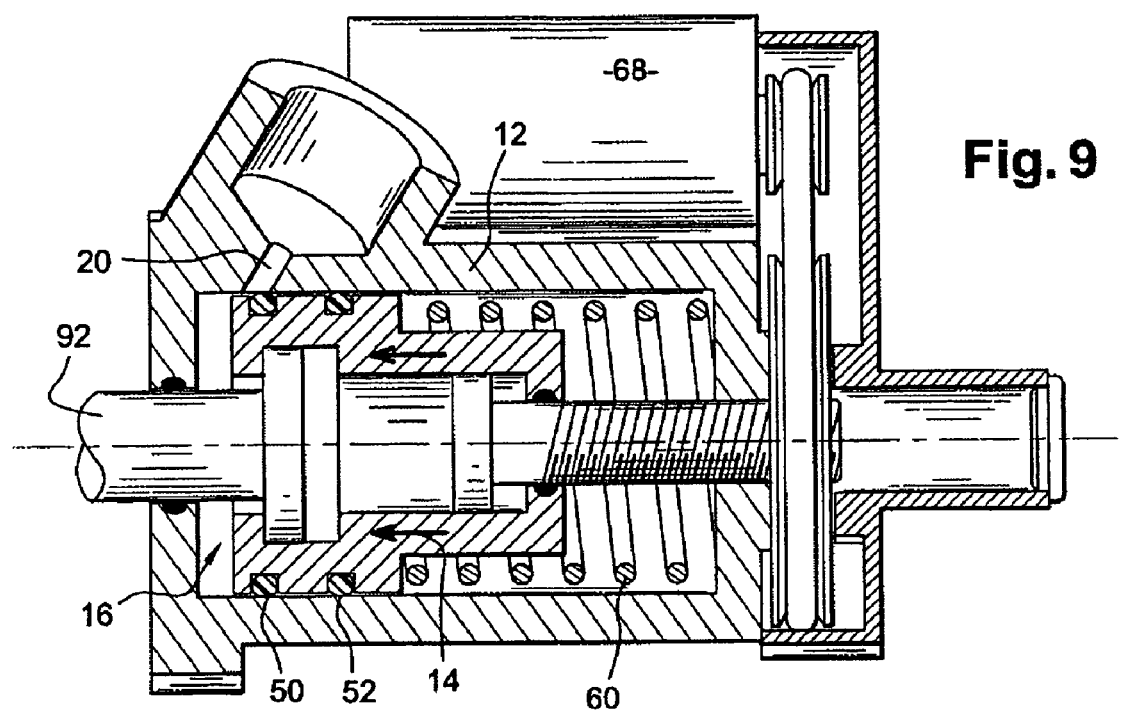
Figure 10:
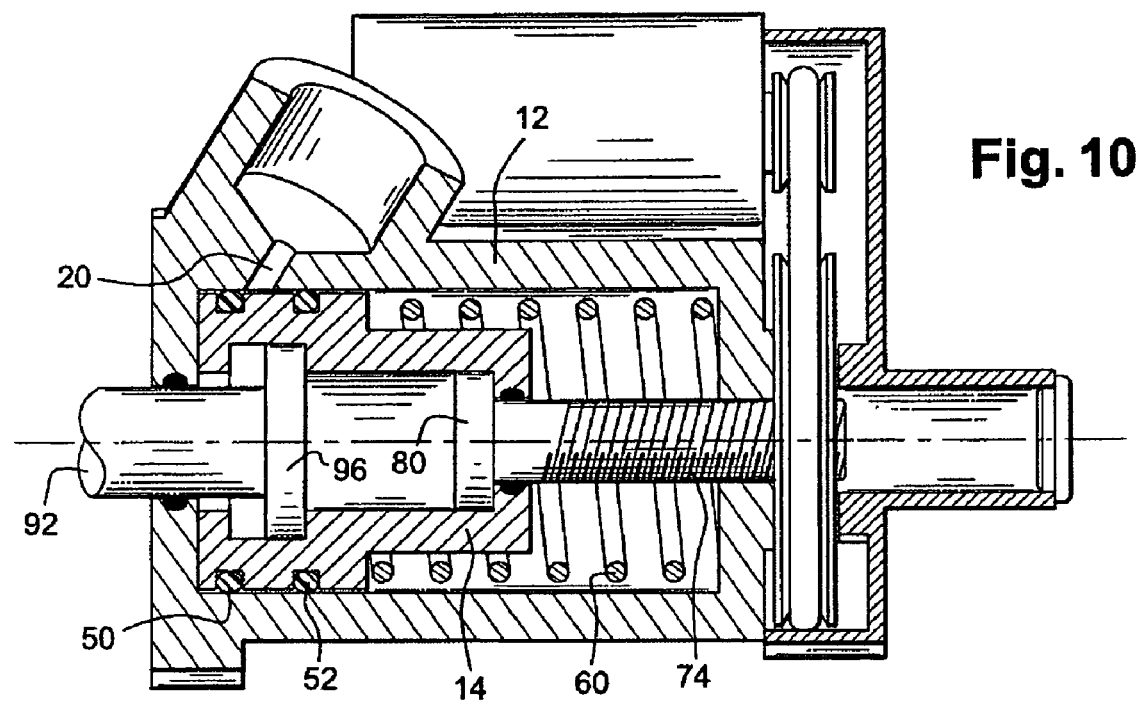

As can be seen in FIGS. 9 and 10, the piston 14 is then elastically returned towards its forward position of rest by the spring 60 and the hydraulic fluid is removed from the front pressure chamber 16 via the supply port 20.

When the parking brake device comprises return means for returning the brake blocking means, for example a spring intended to return to their position of rest the primary and secondary shoes of a drum brake, the return force exerted by these return means is combined with the force of the return spring 60 that returns the piston 14.

Advantageously, the command to activate the parking brake device, that is to say to operate the actuating device, is obtained automatically and independently of any action on the part of the driver by management means, such as a computer associated with sensors, and this is done according to determined operating parameters such as the speed of the vehicle, the selection of a gear or other parameters.

As an alternative, the command to activate the parking brake device is emitted manually by the driver when he or she acts on a control member such as a switch or a rotary switch, so that the pressure force needed is a weak force that can be applied by any driver independently of his or her physical capabilities.

Advantageously, the parking brake constitutes an emergency brake that can be operated automatically or by the driver in the event of failure of the motor vehicle main braking device.

Advantageously, the longitudinal body 94 of the actuating rod 92 is secured at its front end to a connecting cable on which the determined mechanical force is exerted in such a way as to allow a mechanical actuating device to be replaced by an actuating device according to the invention without making any modifications to the parking brake operating member.

As an alternative, the actuating rod 92 acts directly on the operating member, such as a lever, that operates the parking brake.

Advantageously, the actuating device according to the invention can be used to act on the operating member of a parking brake device and the parking brake device comprises a disk brake or drum brake mechanism.

As a preference, the hydraulic actuating device according to the invention is used to control a drum brake mechanism that acts as a parking brake in a hybrid mechanism of the drum-in-hat type.

Of course, the present invention is not in any way restricted to the embodiment which has just been described.

As an alternative, the determined mechanical force which is exerted by the actuating means 90 of the actuating device 10 that actuates the parking brake is a thrusting force.

As an alternative, the control means 58 that control the movement of the piston 14 consist of a member such as a soft iron sleeve secured to the piston 14 and which, in response to means of the electromechanical type, such as an electromagnet, is able to cause the piston 14 to move axially backwards, over the control travel in such a way as to bring the piston 14 into an intermediate position in which the front pressure chamber 16 is supplied with pressurized hydraulic fluid.

The parking brake device according to the present invention is particularly applicable to the motor industry and more specifically to the braking industry specific to motor cars, such as touring cars.

The invention claimed is:

1. Parking or emergency brake device, particularly for a motor vehicle, comprising a controlled actuating device (10) which exerts a determined mechanical force on a brake operating member to immobilize the vehicle, in which the actuating device (10) is being supplied with a pressurized fluid, comprises:

a cylinder (12, 22) in which there slides a piston (14) which axially delimits a front hydraulic pressure chamber (16) to exert said determined mechanical force on the brake operating member over an actuating travel of the piston, and valve means (18) which selectively cause the front hydraulic pressure chamber (16) to be placed in communication with a pressurized hydraulic fluid supply port (20) to establish a hydraulic actuating pressure in the front pressure chamber (16), characterized in that the valve means (18) is interposed between the piston (14) and the cylinder (12), to control an axial movement of the piston (14) over a control travel prior to said actuating travel, said valve means (18) comprise primary (50) and secondary (52) sealing means which are arranged axially respectively in front of and behind the pressurized fluid supply port (20) to isolate the front hydraulic pressure chamber (16) from the supply port (20) when the piston (14) is in a forward position of rest, characterized in that a control means (58) for a translation control of the piston (14) over the prior control travel corresponds to an axial movement of the piston (14) in the cylinder (12, 22) between:

said forward position of rest, towards which the piston (14) is elastically returned and in which the valve means (18) isolate the front hydraulic pressure chamber (16) in a sealed manner from the supply port (20), and an intermediate position in which the front pressure chamber (16) is supplied with pressurized hydraulic fluid, said control means (58) controlling the axial movement of the piston (14) comprise drive means (54), consisting of an electric motor (68), which actuates movement-transmission means (66) allowing a rotational movement of the motor (68) to be converted into translational movement of the piston (14).

2. Parking brake device according to claim 1, characterized in that the movement-transmission means (66) comprise a mechanism of the "screw-nut" type comprising a tapped nut (72) which is axially immobilized and which is driven in rotation by the motor (68) to cause a translational axial movement of a threaded screw (74) received in the nut (72), said screw (74) drives the movement of the piston (14).

3. Parking brake device according to claim 1, characterized in that the piston (14) being moved backwards over said axial actuating travel from said intermediate position to a rear braking position, in which the piston (14) acts on actuating means (90) exerting the determined mechanical force on the brake operating member.

4. Parking brake device according to claim 3, characterized in that a mechanical-locking means (102) axially immobilizes the piston (14) in the rear braking position.

5. Parking brake device according to claim 4, characterized in that the actuating means (90) for actuating the brake operating member are linked to the piston (14) with a determined axial clearance which is roughly equal to the control travel of the piston (14), the actuating means (90) are not influenced when the piston (14) moves from said forward position of rest to said intermediate position.

6. Parking brake device according to claim 3, characterized in that the actuating means (90) are a rod (92) comprising a cylindrical head (96) which is mounted to move axially in a complementary internal cylindrical section (32) of the piston (14) between:

said forward position of rest, in which the head (96) of the rod (92) bears against a rear stop (38) of the internal cylindrical section (32) of the piston (14) in the forward position of rest, and a rear operation position in which the head (96) of the rod (92), which bears against a front stop (36) of the internal cylindrical section (32) of the piston (14) is acted upon during the actuating travel of the piston to exert said determined mechanical force on the brake operating member.

7. Operating method for controlling a parking or emergency brake device of the type comprising an actuating device (90) according to claim 6, characterized in that, for operating the parking brake:

a first step which consists in actuating the control means (58) that control the piston to move the piston (14) from said forward position of rest towards said intermediate position to allow pressurized fluid to be supplied to the front pressure chamber (16);

a second step which consists in supplying the front pressure chamber (16) with hydraulic fluid at a first pressure P1 to cause the piston (14) to move against the action of the return means (60) towards said rear braking position to pull on the actuating means (90) that actuate the brake operating member, to exert a maximum determined mechanical force to immobilize the vehicle in a parking position; and a third step which consists in actuating the locking means (102) to mechanically lock the piston (14) in said rear braking position.

8. Operating method according to claim 7, characterized in that, to release the parking brake, a step that consists in supplying the front pressure chamber (16) with hydraulic fluid at a second pressure P2 higher that the first pressure P1 to allow the unlocking of the piston (14), said piston is returned elastically towards said front position of rest.

* * * * *